United States Patent
Amako et al.

[11] Patent Number: 6,134,878
[45] Date of Patent: Oct. 24, 2000

[54] COOLING ARRANGEMENT FOR A GAS TURBINE DRIVEN POWER SYSTEM

[75] Inventors: Kiyoo Amako; Takahiro Kato, both of Tokyo, Japan

[73] Assignees: STS Corporation; Sho-Ongikenco., Ltd., both of Japan

[21] Appl. No.: 09/158,206

[22] Filed: Sep. 22, 1998

[30] Foreign Application Priority Data

Sep. 24, 1997 [JP] Japan .................................. 9-274953

[51] Int. Cl.⁷ ...................................................... F02G 1/00
[52] U.S. Cl. ........................................ 60/39.33; 60/39.83
[58] Field of Search ................................ 60/39.33, 39.5, 60/39.83, 725, 728

[56] References Cited

U.S. PATENT DOCUMENTS

| | | | |
|---|---|---|---|
| 3,791,682 | 2/1974 | Mitchell | 60/39.31 |
| 4,002,023 | 1/1977 | Hartmann | 60/39.33 |
| 4,382,359 | 5/1983 | Sampayo | 60/728 |
| 4,864,812 | 9/1989 | Rodgers et al. | 60/39.33 |
| 5,649,418 | 7/1997 | Ludwig | 60/39.83 |

FOREIGN PATENT DOCUMENTS 56-32040  4/1981  Japan ..................................... 60/39.83

*Primary Examiner*—Charles G. Freay
*Attorney, Agent, or Firm*—Bachman & LaPointe, P.C.

[57] ABSTRACT

A gas turbine driven power system includes a shell having an air inlet and an exhaust outlet. Mufflers are provided at the air inlet and the exhaust outlet, respectively. A gas turbine as a power source is provided in the shell and includes an inlet port and an outlet port. A heat exchanger is further provided in the shell in an air-passing space free of barrier formed between the muffler at the air inlet and the inlet port of the gas turbine. It is so arranged that all the air introduced into the shell through the air inlet passes through the heat exchanger for heat exchange with heat generated inside the shell.

4 Claims, 4 Drawing Sheets

⇨ Cold Air     ➡ Hot Air

COOLING ARRANGEMENT FOR A GAS TURBINE DRIVEN POWER SYSTEM

BACKGROUND OF THE INVENTION

1. Field of the Invention

The present invention relates to a small-size light-weight gas turbine driven power system with reduced noise, wherein auxiliary devices driven by a gas turbine, such as a generator, a hydraulic pump and an air compressor, are connected to the gas turbine and all the air introduced into the system is subjected to heat exchange for cooling the inside of the system effectively.

2. Description of the Prior Art

Diesel engine generator systems were widely used as the commercial electric power supplies in solitary islands, outlying mountainous regions, etc. and as the emergency electric power supplies in office buildings, hospitals, plants, etc. The diesel engine generator system has the high thermal efficiency and is short in start-up time and easy to handle.

However, the diesel engine generator system is large in size and heavy in weight and, since a cooling tower filled with cooling water is required, the whole structure thereof is realized on a large scale.

In view of this, gas turbine generator systems which are smaller in size and require no cooling water have been widely used lately instead of the diesel engine generator systems. In the gas turbine generator system, cooling is carried out through heat exchange with the open air introduced into the system, instead of the cooling water used in the diesel engine generator system.

JP-A-5-248263 describes the gas turbine generator system of one type. Specifically, the described gas turbine generator system is provided with, besides an air inlet for introducing the open air for combustion, a ventilation inlet for introducing the open air for cooling the inside of the system. The gas turbine generator system of this type requires the two open air inlets as noted above and thus further requires a plurality of air passages in the system corresponding to the two inlets, hence leading to a complicated inside structure of the system.

JP-A-61-49134 describes the gas turbine generator system of another type which has only one open air inlet. Specifically, as shown in FIG. 3, the system comprises a package shell 100 wherein a gas turbine 101 and a generator 102 are disposed. An air inlet 103 is provided at the front side of the package shell 100, while an exhaust joint duct 104 is provided at the rear side thereof.

An intake pipe 105 forms a passage for the open air sucked via the air inlet 103. A baffle plate 106 is suspended from the underside of the intake pipe 105 for baffling the open air introduced onto the generator 102.

In the intake pipe 105, a plurality of sound absorbing plates 107 are disposed in parallel to each other to form splitters 108 which are arranged in two stages.

A first opening 109a is provided between the first-stage splitter 108 and the second-stage splitter 108 for allowing a portion of the open air flowing in the intake pipe 105 to flow downward as a first air flow A1 for cooling the generator 102.

An intake duct 109b is coupled to the intake pipe 105 at a second opening 110 formed in the neighborhood of a downstream end of the intake pipe 105 for feeding the air, flowing downward via the second opening 110 as a second air flow A2, into the gas turbine 101.

An oil cooler 111 is disposed at the downstream end of the intake pipe 105 and connected to the gas turbine 101 via a lubricant pipe arrangement 112 in which lubricating oil is circulated. The oil cooler 111 cools the oil which becomes high in temperature by cooling the heat generated in a combustor 101a of the gas turbine 101. Specifically, when the air flowing in the intake pipe 105 passes through the oil cooler 111, the oil is cooled by the air.

The foregoing first air flow A1 is deflected downward by a blocking plate 113 and introduced into the exhaust joint duct 104 via a vent hole provided downward of the blocking plate 113.

The exhaust joint duct 104 comprises an exhaust pipe 115 of the gas turbine 101, a diffuser 116 and an outlet 117. In the exhaust joint duct 104, the combustor 101a and the exhaust pipe 115 of the gas turbine 101 are projected and the diffuser 116 Is located adjacent thereto.

The diffuser 116 is projected into a flue 118 incorporating therein a muffler (not shown). The first air flow A1 and the third air flow A3 together with exhaust gas from the exhaust pipe 115 are sucked due to an ejector effect provided by the diffuser 116, then flow through the flue 118 and are discharged via the outlet 117 incorporating therein a sound-proof mechanism.

With the foregoing structure, when the gas turbine 101 is operated, the generator is driven to produce an electric power supply of about 150 kw to 20,000 kw.

However, in the foregoing conventional gas turbine generator system shown in FIG. 3, a portion of the open air having passed the first-stage splitter 108 is used for cooling the generator 102, then a portion of the open air having passed the second-stage splitter 108 is fed to the gas turbine 101 for combustion, and then only a small amount of the remainder open air is used for cooling the lubricating oil for the gas turbine 101. Thus, cooling effects achieved in the package shell 100 are quite small. This causes the necessity of providing a plurality of air passages in the package shell 100, leading to an increase in size of the gas turbine generator system.

JU-A-56-77618 describes the gas turbine generator system of still another type as shown in FIG. 4. In this system, an oil cooler 111 carries out heat exchange using the air sucked into a gas turbine 122a, so that the heat exchange efficiency is improved from this aspect. However, the inside of the system is divided into a generator room 121 having therein a generator 12 1a and an engine room 122. having therein a gas turbine 122a, by means of a partition plate 120, and the air introduced into the system is divided so as to be supplied into the two rooms separately. Therefore, the flow rate of the air passing through the oil cooler 111 is reduced correspondingly, and hence, the heat exchange efficiency is not so enhanced as expected.

SUMMARY OF THE INVENTION

Therefore, it is an object of the present invention to provide a gas turbine driven power system that can eliminate one or more of the disadvantages inherent in the foregoing conventional techniques.

According to one aspect of the present invention, there is provided a gas turbine driven power system comprising a shell having an air inlet and an exhaust outlet; a gas turbine as a power source provided in the shell and having an inlet port and an outlet port; and a heat exchanger provided in the shell between the air inlet and the inlet port so that essentially all the air introduced through the air inlet passes through the heat exchanger for heat exchange with heat generated inside the shell.

It may be arranged that a muffler is provided at the air inlet, and that the heat exchanger is provided in an air-passing space free of barrier formed between the muffler and the inlet port of the gas turbine.

It may be arranged that a muffler is provided at the exhaust outlet, that a partition plate is provided in the shell to divide the inside of the shell into a cold section and a hot section, the cold section including therein the inlet port of the gas turbine and the hot section including therein the outlet port of the gas turbine, that an ejector mechanism is provided in the hot section for providing an ejector effect using an exhaust gas discharged from the outlet port of the gas turbine, and that an atmosphere in the hot section is forced out along with the exhaust gas due to the ejector effect so as to be discharged to the exterior of the shell via the muffler and the exhaust outlet.

It may be arranged that the partition plate is formed with an opening, and that a portion of the air introduced into the cold section through the air inlet is sucked into the gas turbine through the inlet port and discharged into the hot section as the exhaust gas, and another portion thereof is introduced into the hot section through the opening of the partition plate using a pressure drop in the hot section caused by the ejector effect.

BRIEF DESCRIPTION OF THE DRAWINGS

The present invention will be understood more fully from the detailed description given hereinbelow, taken in conjunction with the accompanying drawings.

In the drawings:

FIGS. 1A and 1B are diagrams showing a schematic inside structure of a gas turbine driven power system according to a preferred embodiment of the present invention, wherein FIG. 1A is a plan view and FIG. 1B is an elevation view;

FIGS. 2A and 2B are diagrams showing a schematic structure of the gas turbine driven power system shown in FIGS. 1A and 1B, wherein the system is installed in a casing, and wherein FIG. 2A is a plan view and FIG. 2B is an elevation view;

DESCRIPTION OF THE PREFERRED EMBODIMENT

Now, a preferred embodiment of the present invention will be described hereinbelow with reference to the accompanying drawings.

Figure 1A:
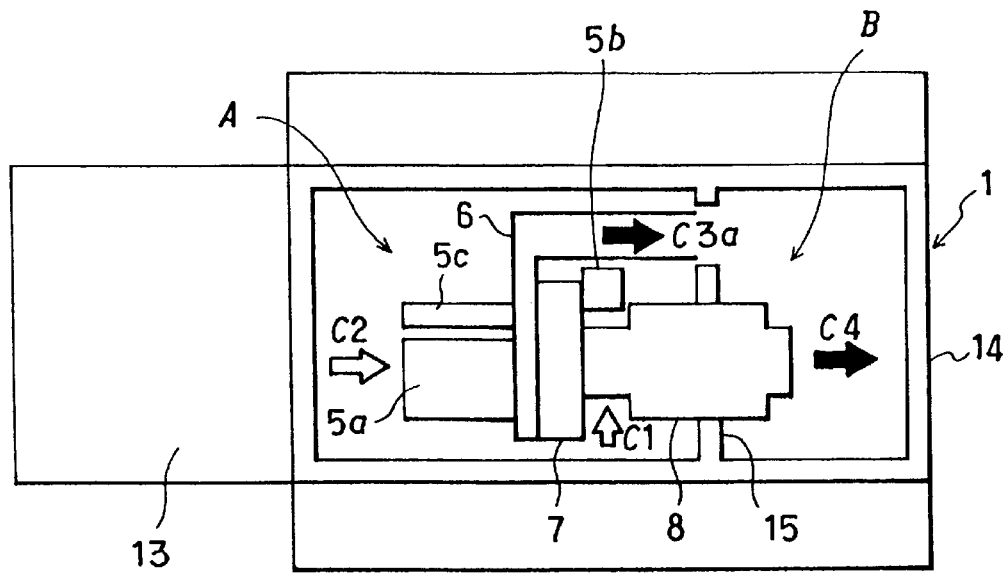
Figure 1B:
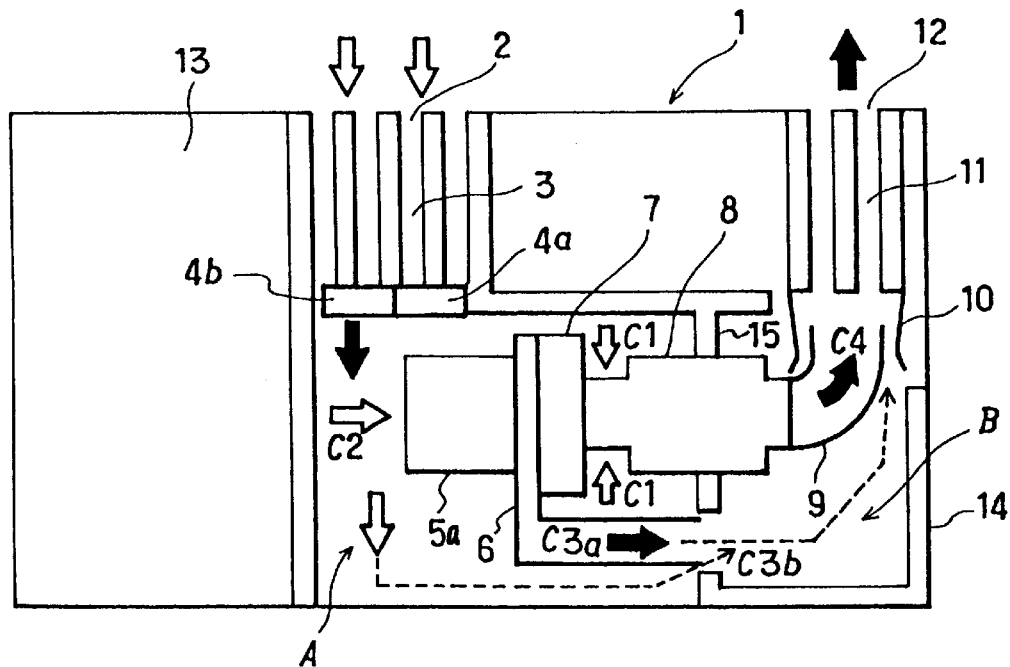

FIGS. 1A and 1B are diagrams showing a schematic inside structure of a gas turbine driven power system 1 according to the preferred embodiment of the present invention. In the figures, the system 1 comprises an air inlet 2 for introducing the air into the system 1, an inlet muffler 3, and heat exchangers 4a and 4b. The system further comprises an ac generator 5a and a hydraulic pump 5b which are driven by a gas turbine 8. Symbol 5c denotes a starter for starting the gas turbine 8. The system 1 further comprises an exhaust duct 6 dedicated for the ac generator 5a, a gear box 7, the gas turbine 8 and a gas turbine exhaust pipe 9. The foregoing components 5a to 9 are integrally disposed.

The system 1 further comprises an ejector portion hood 10, an outlet muffler 11, an exhaust outlet 12 and an inverter (commercial power supply frequency converter) 13.

Symbol 14 denotes a shell of the system 1. In the shell 14, a partition plate 15 is provided on the circumference of the gas turbine 8 so as to divide the inside of the shell 14 into a cold section A (intake side) located at an upstream side of the partition plate 15 and a hot section B (exhaust side) located at a downstream side thereof. As appreciated, the cold section A corresponds to a compressor section of the gas turbine 8 and the gear box 7, while the hot section B corresponds to a combustor and a turbine section of the gas turbine 8.

The inlet muffler 3 is provided at the air inlet 2 and constituted by a plurality of plates, each made of sound absorbing materials, arranged at regular intervals. Sound energy is first dispersed at the air inlet 2 and then sound is absorbed when the air passes through between the plates made of the sound absorbing materials. Mufflers of this type are described in Japanese Patents Nos. 872,643 and 916,818 whose contents are incorporated herein by reference for the sake of disclosure.

The heat exchanger 4a is for cooling a hydraulic circuit used for cooling the hydraulic pump 5b, while the heat exchanger 4b is for cooling lubricating oil of the gear box 7. An air-passing space free of barrier is provided between the inlet muffler 3 and an inlet port of the gas turbine 8. The heat exchangers 4a and 4b are disposed in this air-passing space. The heat exchangers 4a and 4b carry out heat exchange between all the air (low temperature) introduced into the system 1 and passing through the inlet muffler 3 and the heat generated from the hydraulic circuit used for cooling the hydraulic pump 5b and from the lubricating oil of the gear box 7.

Since an intake air amount of the gas turbine 8 is quite large, the open air is vigorously sucked into the cold section A. From a relationship in ratio between an intake air amount (=air amount passing through the heat exchangers) and an exchange heat quantity, a temperature of the air introduced into the cold section A subsequent to the heat exchange at the heat exchangers 4a and 4b is increased only by several degrees as compared with an outside air temperature.

The ac generator 5a is of an air cooling type. A rotor (not shown) is provided in the ac generator 5a and rotated at high speed by the gas turbine 8 via the gear box 7 so that the ac power is produced based on the principle of induced electromotive force.

The exhaust duct 6 for the ac generator 5a extends from between the ac generator 5a and the gear box 7 to an opening formed at a corresponding portion of the partition plate 15. The ac generator exhaust duct 6 forms a passage for carrying the heat generated by the ac generator 5a to the hot section B, using a cooling fan (not shown) coaxial with the foregoing rotor of the ac generator 5a. Specifically, the ac generator 5a located in the cold section A is cooled by the cooling fan, and the air used for cooling the ac generator 5a is transferred to the hot section B via the ac generator exhaust duct 6.

On the other hand, the air warmed by the radiant heat from the surfaces of the gear box 7, the starter 5c and the hydraulic pump 5b in the cold section A is discharged into the hot section B via a given gap formed between an outlet (downstream end) of the ac generator exhaust duct 6 and a corresponding portion, at the opening, of the partition plate 15, so that the cold section A is ventilated. Specifically, the pressure in the hot section B is lowered due to an ejector effect caused by an action of the exhaust from the gas turbine 8, so that the air in the cold section A is sucked into the hot section B.

By utilizing the exhaust action, it is not necessary to provide either a heat exchanger cooling fan or a blower for ventilation in the shell. This eliminates the need for a corresponding electric power supply, leading thereby to reduction in size and weight of the system 1.

The gear box 7 transmits the rotational power of the gas turbine to the ac generator 5a and the hydraulic pump 5b. Specifically, the gear box 7 transmits the rotational power of the gas turbine 8 via gears (not shown) to a shaft (not shown), and then the ac generator 5a and the hydraulic pump 5b are driven through the rotation of the shaft.

The gas turbine 8 compresses the air introduced via the air inlet 2 and the inlet muffler 3, and burns fuel with the compressed air in the combustor of the gas turbine 8. The combustion produces high-temperature/high-pressure gas which rotates the turbine at high speed so that a large rotational force can be obtained.

The rotational force produced by the gas turbine 8 is transmitted to the ac generator 5a and the hydraulic pump 5b via the gear box 7, while maintaining the high speed.

The gas turbine exhaust pipe 9 forms a passage for conducting high-temperature exhaust gas from an outlet port of the gas turbine 8 toward the outlet muffler 11.

The ejector portion hood 10 conducts the exhaust gas from the gas turbine exhaust pipe 9 to the outlet muffler 11. The ejector portion hood 10 covers an outlet (downstream end) of the gas turbine exhaust pipe 9 with a given gap therebetween. This gap serves to generate the ejector effect so as to eliminate the need for the foregoing blower etc.

The outlet muffler 11 is provided at the exhaust outlet 12 and, like the inlet muffler 3, constituted by a plurality of plates, each made of sound absorbing materials, arranged at regular intervals. With respect to the exhaust, sound energy is dispersed at the ejector portion hood 10 and then sound is absorbed when passing through between the plates made of the sound absorbing materials. Mufflers of this type are described in Japanese Patents Nos. 872,643 and 916,818.

The shell 14 is constituted by soundproof walls which can reduce noise produced by the foregoing components. In this embodiment, as the soundproof wall, a sound absorption type MSB (micro silencer board) described in Japanese Patent No. 1,145,191 is used.

Figure 2A:
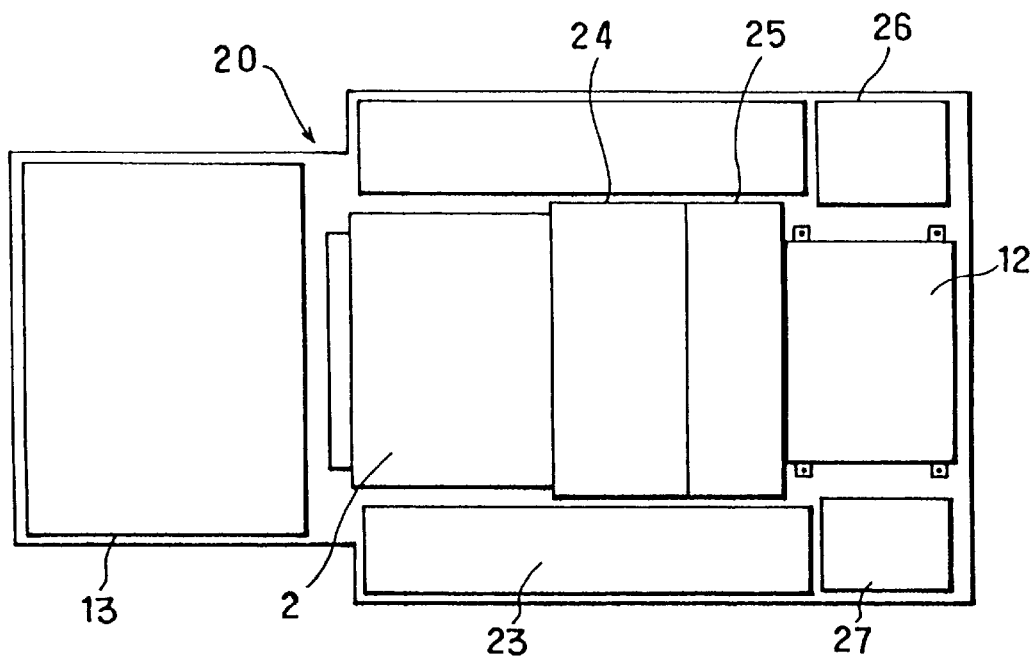
Figure 2B:
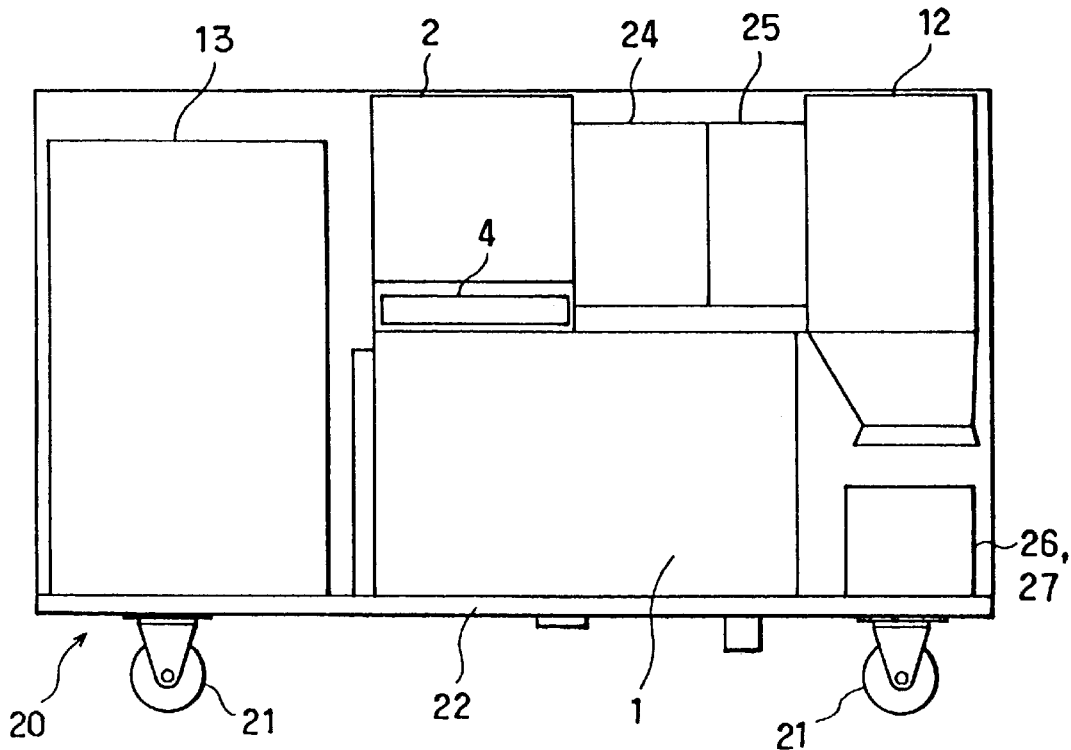
Figure 3:
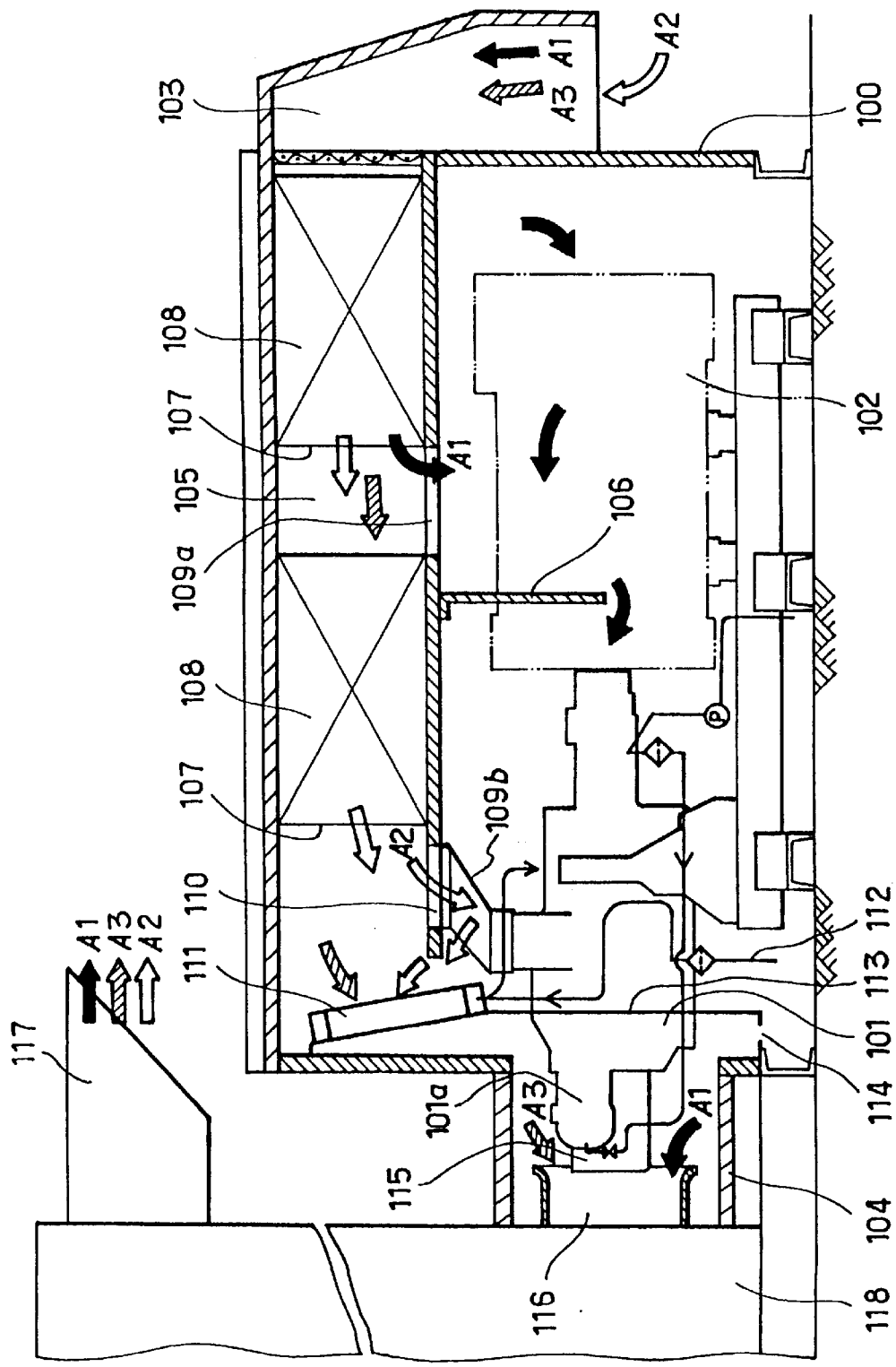
FIG. 3 is a diagram showing a schematic structure of a conventional gas turbine generator system.
Figure 4:
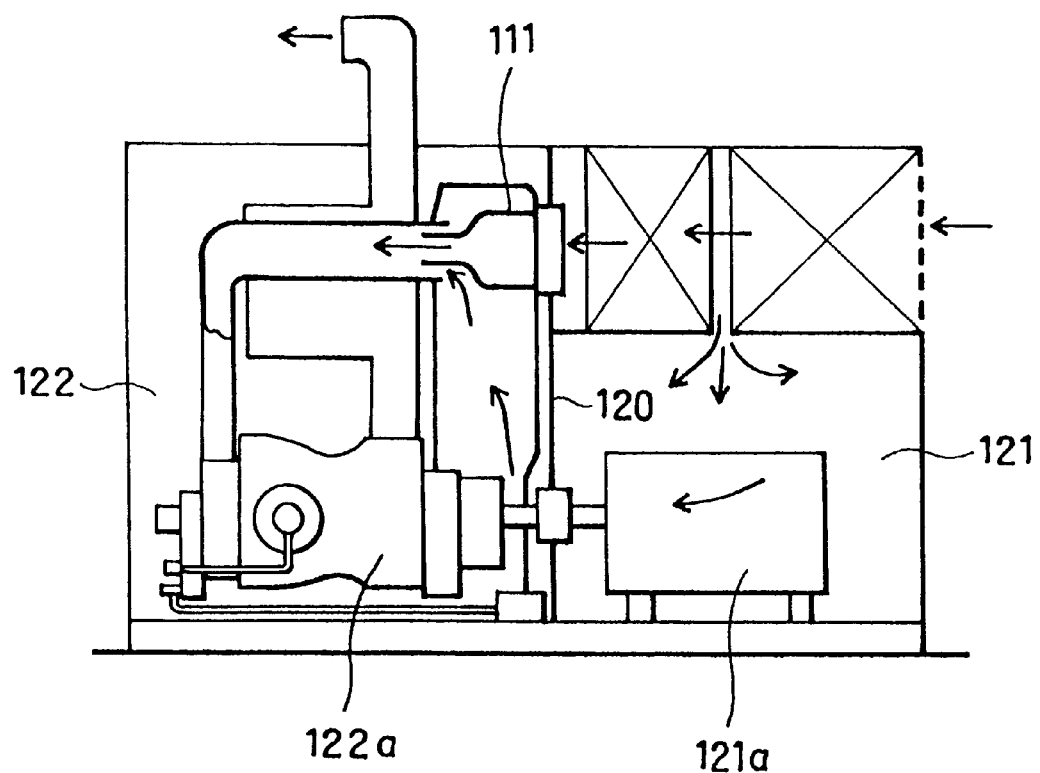
FIG. 4 is a diagram showing a schematic structure of another conventional gas turbine generator system.

As shown in FIGS. 2A and 2B, the gas turbine driven power system 1 is installed on a package floor 22 forming a part of a casing 20 and provided with carrying rollers 21. In the casing 20, a package shell control device 23 is disposed at a side of the system 1.

At an upper portion of the system 1 between the inlet muffler 3 and the outlet muffler 11 are arranged a fuel tank 24 storing fuel to be burned at the gas turbine 8, and an oil tank 25 storing oil for hydraulic pressure. Further, at a lower-rear portion of the system 1 on both sides thereof, batteries 26 and 27 are arranged, respectively.

The package shell control device 23 is for mainly controlling an operation of the system 1. For example, based on the contents commanded through a control panel, the package shell control device 23 drives the ac generator 5a, the hydraulic pump 5b and the gas turbine 8, and adjusts supply amounts of the oil and fuel.

Now, the operation of the system 1 will be described with reference to FIGS. 1A to 2B.

When the gas turbine 8 is driven to start the ac generator 5a, the open air (low temperature) around the system 1 is sucked into the cold section A via the air inlet 2, the inlet muffler 3 and the heat exchangers 4a and 4b. Specifically, immediately after the air passes through the inlet muffler 3, the heat generated from the hydraulic circuit for cooling the hydraulic pump 5b and the heat generated from the lubricating oil of the gear box 7 are subjected to heat exchange with the low-temperature open air at the heat exchangers 4a and 4b. In this state, the air is introduced into the cold section A.

The low-temperature air is vigorously sucked into the cold section A so that the heat exchange between the introduced air and the heat from the hydraulic circuit etc. is effectively carried out at the heat exchangers 4a and 4b.

In this event, the temperature of the air sucked into the cold section A is maintained relatively low on the whole.

Then, the air is sucked into the gas turbine 8 (see arrow C1), wherein it is compressed and burns the fuel in the combustor.

The combustion in the combustor causes the turbine to rotate so that the foregoing shaft is rotated through the gears in the gear box 7 to rotate the rotor, connected to the shaft, of the ac generator 5a. When the foregoing coaxial cooling fan of the ac generator 5a is rotated, the ac generator 5a sucks the low-temperature air (see arrow C2) in the cold section A so that the ac generator 5a is cooled.

Then, the high-temperature air after cooling the ac generator 5a is discharged into the hot section B (see arrow C3a) through the ac generator exhaust duct 6. On the other hand, when the combustion occurs in the combustor of the gas turbine 8 as described above, high-temperature exhaust gas is produced. The exhaust gas is carried to the outlet muffler 11 via the gas turbine exhaust pipe 9 (see arrow C4). In this event, due to the ejector effect caused by the exhaust gas, the air in the hot section B is vigorously discharged to the outlet muffler 11 via the gap formed between the outlet of the gas turbine exhaust pipe 9 and the ejector portion hood 10.

On the other hand, following the pressure drop in the hot section B due to the ejector effect caused by the action of the exhaust from the gas turbine 8, the air warmed by the radiant heat from the surfaces of the gear box 7, the starter 5c and the hydraulic pump 5b in the cold section A is discharged into the hot section B (see arrow C3b) via the gap formed between the outlet of the ac generator exhaust duct 6 and the corresponding portion, at the opening, of the partition plate 15. Accordingly, the cold section A is ventilated.

Specifically, when the pressure drop occurs in the hot section B due to the ejector effect caused by the action of the exhaust from the gas turbine, the air in the cold section A is ejected into the hot section B (see arrow C3b) via the gap between the ac generator exhaust duct 6 and the partition plate 15, and the air from the ac generator exhaust duct 6 is also discharged into the hot section B (see arrow C3a).

The exhaust (C3a, C3b, C4) passes through the outlet muffler 11 so that exhaust sound is reduced, and then is forced out to the exterior of the system 1 or the shell 14 via the exhaust outlet 12.

Specifically, all the air sucked into the system 1 via the air inlet 2 passes through the inlet muffler 3 and the heat exchangers 4a and 4b and enters the cold section A. The air C1 entering the cold section A is taken into the gas turbine 8 for combustion in the combustor. The high-temperature exhaust C4 thereof is discharged via the gas turbine exhaust pipe 9, and then passes through the ejector portion hood 10 and the outlet muffler 11 along with the exhaust C3a and the exhaust C3b, so as to be discharged via the exhaust outlet 12 to the exterior.

The high-temperature exhaust C3a after cooling the inside of the ac generator 5a is discharged into the hot section B from the cold section A via the ac generator exhaust duct 6, and then discharged to the exterior via the exhaust outlet 12 along with the exhaust (C3*b*, C4).

The high-temperature exhaust C3*b* after cooling the inside of the cold section A flows into the hot section B via the gap provided at the opening of the partition plate 15, and then is discharged to the exterior via the exhaust outlet 12 along with the exhaust (C3*a*, C4).

In the foregoing fashion, the inside of the shell 14 is ventilated to ensure the cooling effect.

Since all the air for the system 1 is introduced through the air inlet 2 and then passes through the inlet muffler 3, and all the exhaust passes through the outlet muffler 11 and is then discharged through the exhaust outlet 12, the suction sound and exhaust sound can be effectively suppressed. It has been confirmed that noise of the system 1 can be reduced to less than about 75 dB(A) at points spacing about 3 meters from the shell 14.

In the foregoing embodiment, the ac generator and the hydraulic pump are connected to the gas turbine so as to be operated. However, as long as it can be operated by the external rotational power, a device such as an air compressor may also be used.

Further, in the foregoing embodiment, the ac generator is connected to the gas turbine to obtain the ac power. On the other hand, a dc generator may be connected to the gas turbine to obtain the dc power. Other externally powered devices may also be connected so as to be driven independently or in combination.

Further, in the foregoing embodiment, the air inlet and the exhaust outlet are provided in the upper portion of the system, and the inlet muffler and the outlet muffler are provided at the air inlet and the exhaust outlet, respectively. However, the positions of the air inlet and the exhaust outlet are not particularly limited. For example, in consideration of uses or air circulation in the system, the intake or exhaust, or both may be carried out in the lateral direction of the system. Further, in consideration of an influence due to air circulation caused by the intake and exhaust of the gas turbine, although not shown in FIGS. 1A and 1B, there may be provided an inlet hood for the air intake from the left in the figures and an outlet hood (which opens when the exhaust is discharged) for the exhaust to the right in the figures.

Further, in the foregoing embodiment, the air cooling type generator is used. On the other hand, an oil cooling type generator may be used. In this case, the generator dedicated exhaust duct is not required, and, instead of it, a heat exchanger for cooling lubricating oil for the oil cooling type generator may be additionally provided along with the heat exchangers 4*a* and 4*b*.

Further, in the foregoing embodiment, the high-speed output of the gas turbine can be inputted into the ac generator at a relatively small reduction ratio by means of the gear box. Accordingly, the system can provide an electric power supply with high-frequency output (in the foregoing embodiment, as high as 400 Hz), which may also be used as a commercial electric power supply using a converter.

Further, according to the foregoing embodiment, the system can be reduced in size and weight so that it can be easily carried upon emergency using, for example, a 2-ton truck.

Ventilation of the system after stopping the operation thereof can be carried out using a motoring mode of the gas turbine. As appreciated, the motoring mode differs from the normal operation mode of the gas turbine in that only the compressor of the gas turbine is rotated by the rotational force of the starter 5*c* without burning the fuel. No particular fan or control device is separately required for carrying out the motoring mode of the gas turbine.

As described above, according to the foregoing preferred embodiment, since all the air sucked into the system due to the intake operation of the gas turbine passes through the heat exchangers provided in the air-passing space free of barrier, the heat exchange efficiency is highly enhanced.

Further, since the system does not allow the high-temperature exhaust from returning to mix with the low-temperature air introduced via the air inlet, the inside of the shell can be effectively carried out.

While the present invention has been described in terms of the preferred embodiment, the invention is not to be limited thereto, but can be embodied in various ways without departing from the principle of the invention as defined in the appended claims.

What is claimed is:

1. A gas turbine driven power system comprising:

a shell having an air inlet and an exhaust outlet;

a gas turbine as a power source provided in said shell and having an inlet port and an outlet port;

a heat generating member which generates heat; and a heat exchanger provided in said shell between said air inlet and said inlet port so that essentially all the air introduced through said air inlet passes through said heat exchanger for heat exchange with heat generated inside said shell by said heat generating member, wherein said air having passed through said heat exchanger is partly used for combustion in said gas turbine.

2. A gas turbine driven power system comprising:

a shell having an air inlet and an exhaust outlet;

a gas turbine as a power source provided in said shell and having an inlet port and an outlet port;

a heat exchanger provided in said shell between said air inlet and said inlet port so that essentially all the air introduced through said air inlet passes through said heat exchanger for heat exchange with heat generated inside said shell; and a muffler provided at said air inlet, wherein said heat exchanger is provided in an air-passing space free of barrier formed between said muffler and said inlet port of the gas turbine.

3. A gas turbine driven power system comprising:

a shell having an air inlet and an exhaust outlet;

a gas turbine as a power source provided in said shell and having an inlet port and an outlet port;

a heat exchanger provided in said shell between said air inlet and said inlet port so that essentially all the air introduced through said air inlet passes through said heat exchanger for heat exchange with heat generated inside said shell; and a muffler provided at said exhaust outlet, wherein a partition plate is provided in said shell to divide the inside of said shell into a cold section and a hot section, said cold section including therein said inlet port of the gas turbine and said hot section including therein said outlet port of the gas turbine, wherein an ejector mechanism is provided in said hot section for providing an ejector effect using an exhaust gas discharged from said outlet port of the gas turbine, and wherein an atmosphere in said hot section is forced out along with said exhaust gas due to said ejector effect so as to be discharged to the exterior of said shell via said muffler and said exhaust outlet.

4. The gas turbine driven power system according to claim 3, wherein said partition plate is formed with an opening, and wherein a portion of the air introduced into said cold section through said air inlet is sucked into said gas turbine through said inlet port and discharged into said hot section as said exhaust gas, and another portion thereof is introduced into said hot section through said opening of the partition plate using a pressure drop in said hot section caused by said ejector effect.

\* \* \* \* \*